Nov. 22, 1949     L. E. WOOD     2,488,573
EVACUATION PUMP AND FILLER ASSEMBLY
FOR FILLING BATTERIES

Filed Feb. 12, 1945     3 Sheets—Sheet 1

INVENTOR.
L. E. WOOD
BY
Ray D Bateman
ATTORNEY

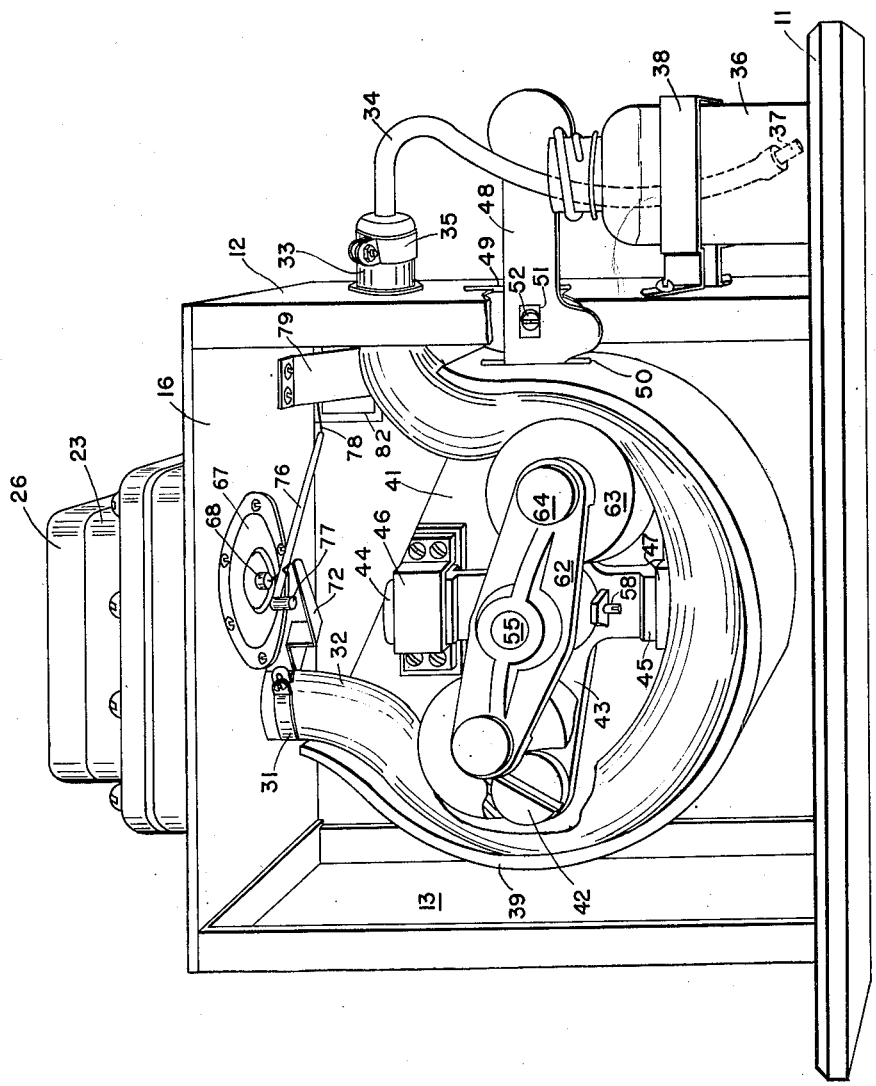
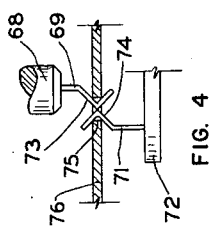

INVENTOR.
L.E. WOOD

Patented Nov. 22, 1949

2,488,573

UNITED STATES PATENT OFFICE 2,488,573

EVACUATION PUMP AND FILLER ASSEMBLY FOR FILLING BATTERIES

Louvan E. Wood, Baltimore, Md., assignor to Bendix Aviation Corporation, South Bend, Ind., a corporation of Delaware Application February 12, 1945, Serial No. 577,490

3 Claims. (Cl. 226—19)

1

The present invention relates to an apparatus for filling storage batteries and the like, and is more particularly concerned with the filling of miniature multiple cell batteries of the character in which the cells are completely sealed, except for a series of small capillary filling openings, through which the electrolyte is introduced just prior to use, although the invention is not limited to such application.

It is customary to fill batteries of this character in the field, or at the point of use, but due to the lack of completely satisfactory filling methods and apparatus, this has heretofore involved considerable time and effort.

It is the major object of this invention to provide a novel apparatus for filling batteries or the like which are simple and efficient and which may be readily carried out in the field by comparatively inexperienced workers.

Another important object is to provide a novel battery filling apparatus embodying an evacuating pump and filler assembly in which a common controllable line is employed for exhausting the battery of air and filling it with electrolyte, and which is so designed that it does not require the manipulation of a valve to feed the electrolyte into the battery line.

A further object is to provide a novel battery filling device or the like, embodying a rubber or other resiliently deformable tube which is progressively flattened at a multiplicity of regions throughout its length, to produce uni-directional air flow, and means are provided whereby the pressure may be relieved at any desired time and free passage of air through the tube permitted.

It is a further object to provide a novel battery filling device embodying an evacuating chamber over which the battery may be sealingly applied; an exhaust pump having an intake communicating with the evacuating chamber and with a pressure gauge to indicate the degree of evacuation, and having an outlet communicating with a body of electrolyte which forms a one-way fluid seal or valve and prevents ingress of air into the pump but does not interfere with egress of air therefrom, the pump being selectively operable, upon completion of the evacuating operation, to permit atmospheric pressure to force electrolyte through the pump into the battery.

Further objects become apparent as the specification proceeds in conjunction with the annexed drawings and from the appended claims.

In the drawings:

Figure 2 is a perspective view of the apparatus with the rear cover removed and parts broken away to more clearly illustrate the construction.

Figure 4 is a fragmental view on an enlarged scale of the connection between the pointer and its support and its actuator finger.

Figure 1:
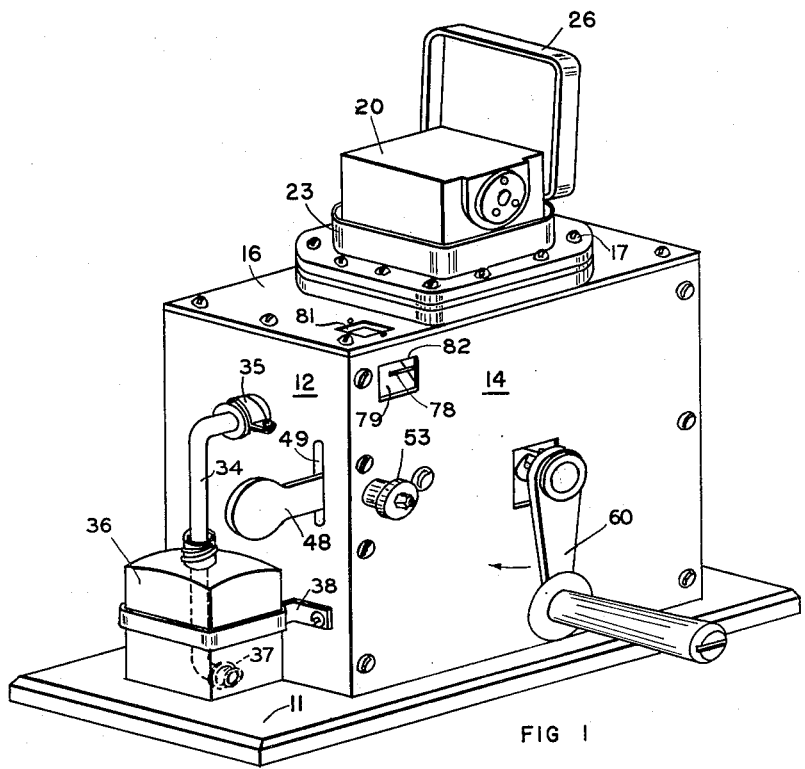
Figure 1 is a perspective view illustrating the battery filling apparatus of the invention, with a battery in place thereon ready for filling.

With continued reference to the drawings, in which like reference characters have been employed to designate similar parts throughout the several views; the apparatus is made up of a base 11 on which a generally rectangular housing having front and rear walls 12 and 13, side walls 14 and 15, and a top wall 16, is rigidly secured in any suitable manner. Secured to top wall 16 by screws 17 is a block 18 having a recess 19 which cooperates with the battery to form an evacuating chamber. It is provided with a sloping bottom wall 21 for the purpose of returning any excess acid to a suction line 22 formed in the block.

Figure 3:
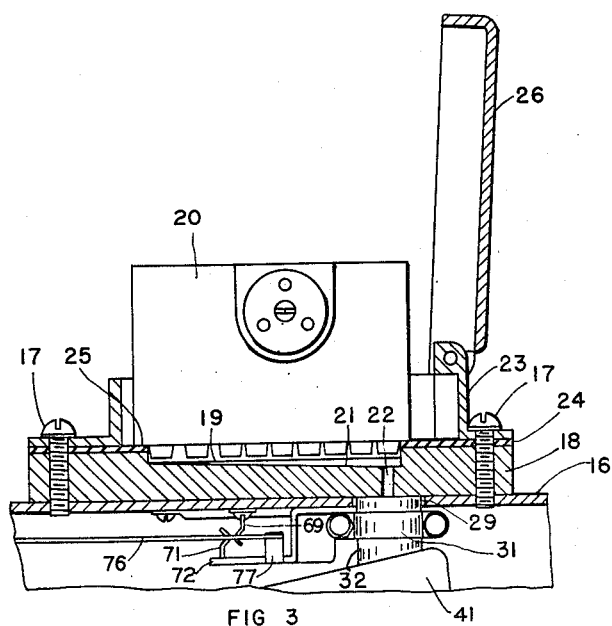
Figure 3 is a vertical sectional view through the evacuating chamber of the apparatus showing a battery in place ready for filling.

Also secured in place by screws 17 is a battery receptacle 23, a gasket 24 being disposed between it and the block for the purpose of forming a seat 25 upon which the battery 20 is adapted to rest in sealing engagement, as indicated in Figure 3. A hinged cover 26 or the like closes the battery receptacle when the apparatus is not in use.

I found that by providing the foregoing battery receptacle and evacuating chamber assembly, and placing the latter in fluid communication with a suction pump of novel form, and discharging the pump into a body of electrolyte during evacuation of air from the battery, and by simply permitting reverse flow through the pump when evacuation is completed, an extremely simple and yet efficient battery filling apparatus is provided, and one in which there is no need for valves which must be manipulated to alternately exhaust the battery of air and admit electrolyte to the battery filling line.

Figure 5:
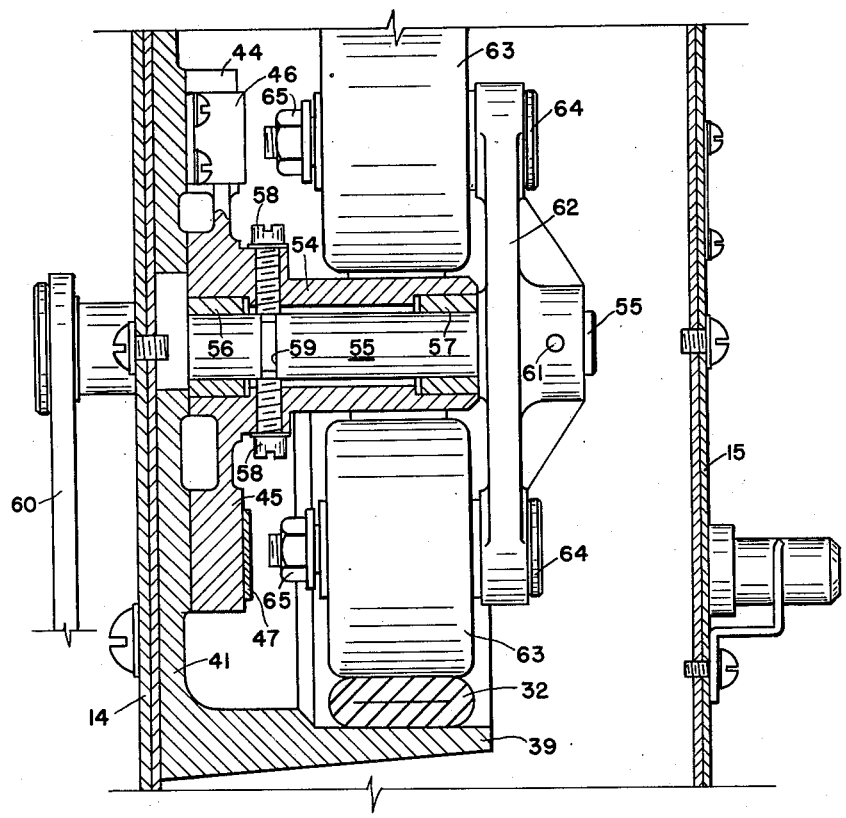
Figure 5 is a vertical sectional view illustrating the pump assembly.

The pump is constructed as seen more particularly in Figures 2 and 5. Suction line 22 terminates in a fitting projecting through an opening 29 in top 16 (not shown), and tightly secured thereto, as by means of a clamp assembly 31, is a flexible hose 32 which may be constructed of rubber or any other suitable resiliently deformable material. Tube 32 passes downwardly in the housing and forms an arc of approximately 270°, and terminates in an end 33 projecting through the front wall of the housing. Coupled to the projecting end of the tube by means of a clamp assembly 35, is a smaller tube 34, and it passes into an electrolyte bottle or other container 36, and has a discharge nozzle 37 terminating adjacent the bottom of the bottle. The latter is supported upon base 11 and is retained against displacement by means of a bracket 38 secured to the front wall of the housing. A pumping action is set up in the resilient tube in the manner that will now be described.

As seen in Figure 2, a backing member 39, of approximately the same effective length as tube 32, lies closely outside of the tube and is provided with a base portion 41 which is secured to side wall 14 by screws or the like. Base 41 also functions to support the rotating parts of the pump, in the manner now to be set forth.

Pivotally mounted on a screw 42, carried by the base adjacent rear wall 13 of the housing, is a lever arm 43 having upper and lower guiding portions 44 and 45, which are slidably disposed in stirrup-like guides 46 and 47 respectively. The lever is also provided with a handle portion 48, which projects through elongated slots 49 and 50, located in the front wall and in shoe 39 respectively, and its range of movement is limited thereby. It also has a locking recess 51 which cooperates with the inner end 52 of a locking plunger 53, mounted for reciprocation in the housing. The plunger may be urged into cooperation with recess 51 by means of a spring or may be manually actuated. The parts are shown with the lever locked in pumping position.

Referring to Figure 5, the mid portion of the lever is provided with an enlarged laterally extending hub portion 54, in which a crank shaft 55 is journaled by means of bearings 56 and 57, the shaft being restrained against endwise displacement by means of set screws 58, which have reduced ends seating in a groove 59 provided in the shaft. Rigidly secured to the inner end of shaft 55 by means of a pin 61, is a spider 62 having a pair of diametrically opposed arms. Journaled for free rotation on each arm is a roller 63, the roller being carried by a bearing assembly (not shown), which in turn is supported on a pin 64 secured in place on each arm by nut 65. The shaft is adapted to be rotated by a crank 60, which may be removable, for purposes of portability.

As seen in Figure 5, with the parts disposed in the position shown, the lower roller 63 is illustrated in such position as to tightly force deformable tube 32 against backing member 39, with the result that its walls are disposed in fluid-tight engagement with each other; it being understood that by locating the rollers 180° apart, and by locating tube 32 along an arc of more than 180°, a pumping action is set up in response to rotation of shaft 55 by reason of the progressive flattening of the tube at predetermined spaced regions so that the following roller engages and flattens the tube to establish a seal just prior to the time the leading roller leaves the tube, whereby a seal is constantly maintained unless intentionally released in the manner which will be later set forth. The rollers therefore progressively propel air bubbles of predetermined length along the length of the tube towards the electrolyte container.

From the foregoing it is apparent that by rotating crank 60 in the direction indicated in Figure 1, rollers 63 will cause air bubbles to be evacuated from the battery chamber, and they will pass through discharge nozzle 37 and bubble upwardly through the body of electrolyte. When the evacuation chamber and battery seated thereon have been evacuated to a predetermined degree, plunger 53 is grasped and pulled outwardly so as to withdraw it from locking cooperation with lever 43. This permits the inherent resilience of tube 32 to lift the spider and roller assembly sufficiently to establish free communication between the evacuation chamber and the electrolyte jar, with the result that atmospheric pressure, acting upon the electrolyte level forces electrolyte through tube 32 into the evacuation chamber and the battery.

In order to afford an indication when the foregoing pumping operation has progressed to the desired degree, I preferably provide a pressure gauge comprising a flexible, electrolyte resistant diaphragm 67, sealingly secured in an opening in the top wall of the housing and disposed in fluid communication with the evacuation chamber. The diaphragm carries a boss 68 to which a pointer actuating finger 69 is secured. A similar finger 71 is carried by a support 72 secured to the underside of the housing top. Fingers 69 and 71 are provided with re-entrant portions 73 and 74 respectively, which resiliently engage the opposite ends of a diamond-shaped opening 75 in a pointer 76 and jointly support the latter. The pointer is provided at its inner end with a counterweight 77, and at its outer end with an indicator finger 78, which cooperates with an inclined reflector or mirror 79 supported in a housing opposite a pair of windows 81 and 82.

Accordingly, as the evacuation process is carried out in the manner previously described, diaphragm 67 moves upwardly, causing pointer 76 to rock downwardly about re-entrant portion 74 as an axis. When the pumping operation has proceeded sufficiently to bring indicator finger 78 to within a predetermined distance from reflector 79, as observed through window 81 or window 82, depending upon the calibration of the particular device, such pointer position is indicative of a satisfactory state of evacuation and pumping may be discontinued and the battery filled in the manner previously set forth, by withdrawing plunger 53 and establishing free communication between the battery and the electrolyte bottle.

From the foregoing detailed disclosure it is apparent that the invention provides novel methods of an apparatus for filling batteries and the like, which, by employing an evacuation chamber and pump assembly having a common evacuation and filling line, which bubbles the exhausted air through a body of electrolyte during evacuation, and permits reverse flow through the pump during filling, accomplishes the operations efficiently and with a minimum of apparatus, completely eliminating the need for the valving and piping arrangements heretofore used in prior methods and apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent, is:

1. In a battery filling apparatus, a base, a generally rectangular housing secured to said base, said housing having side walls and a top wall, a block secured to said top wall for receiving thereon an apertured battery, said block having a recess therein communicating with the apertures of said battery and forming an evacuating chamber, a gasket secured to said block surrounding said recess whereby said battery sealingly engages said block, said recess having a sloping bottom wall, a suction line in said block communicating with said evacuating chamber through said sloping bottom wall, said top wall of said housing having an opening therein communicating with said suction line, a slotted backing member of substantially arcuate form secured within the interior of said rectangular housing, a resilient hose overlaying said backing member, a fluid container supported by said base externally of said housing and having fluid therein, means for supporting one end of said hose so as to establish fluid-tight communication between said hose and said suction line, means comprising an opening in one of said side walls of said housing for supporting the other end of said hose, means for establishing fluid-tight communication between said other end of said hose and said fluid container below the liquid level thereof, a shaft mounted for rotation and extending through a side wall of said housing, a crank secured to said shaft externally of said housing, a plurality of presser rollers secured to said shaft and adapted upon rotation of said shaft to progressively collapse said resilient hose against said backing member, and a latching lever extending through said slot in said backing member for shifting the center of rotation of the presser rollers and at least partially disengaging said presser rollers from said resilient hose.

2. The combination defined by claim 1 having pressure indicating means comprising a flexible diaphragm sealingly secured to the top wall of said housing and having one side disposed in fluid communication with said evacuating chamber, the other side of said diaphragm being exposed to atmosphere, and an indicating arm actuated by said diaphragm in response to variations in pressure within said evacuating chamber.

3. The combination defined by claim 2 having windows in one of said side walls and said top wall, respectively, of said housing, an inclined mirror secured within said housing opposite said windows, and an indicator finger on said indicating arm cooperating with said mirror to give a visual indication of the position of said indicator finger through both of said windows.

LOUVAN E. WOOD.

REFERENCES CITED

The following references are of record in the file of this patent:

UNITED STATES PATENTS

| Number | Name | Date |
| --- | --- | --- |
| 496,559 | Fraser et al. | May 2, 1893 |
| 704,565 | Nelson | July 15, 1902 |
| 1,848,024 | Owen | Mar. 1, 1932 |
| 2,094,524 | Busch | Sept. 28, 1937 |
| 2,311,367 | Chambers | Feb. 16, 1943 |